US011536301B2

(12) United States Patent
Makiura et al.

(10) Patent No.: US 11,536,301 B2
(45) Date of Patent: Dec. 27, 2022

(54) FIXING MEMBER AND JOINED COMPONENT

(71) Applicant: FUTABA INDUSTRIAL CO., LTD., Aichi (JP)

(72) Inventors: Shota Makiura, Aichi (JP); Kousuke Tsuboi, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 94 days.

(21) Appl. No.: 17/209,771

(22) Filed: Mar. 23, 2021

(65) Prior Publication Data

US 2021/0301847 A1    Sep. 30, 2021

(30) Foreign Application Priority Data

Mar. 24, 2020  (JP) ............................. JP2020-052789

(51) Int. Cl.
*F16B 2/22*   (2006.01)

(52) U.S. Cl.
CPC ..................... *F16B 2/22* (2013.01)

(58) Field of Classification Search
CPC .......... F16B 2/22; F16B 9/058; F16B 21/125; F16B 21/065; F16B 21/06; Y10T 24/44026; Y10T 403/7083; Y10T 403/7079
See application file for complete search history.

(56) References Cited

U.S. PATENT DOCUMENTS

| 1,296,042 | A | * | 3/1919 | Bralove | F16B 7/00 403/379.2 |
| 2,589,482 | A | * | 3/1952 | Downey | F16B 21/12 403/379.2 |
| 7,922,016 | B1 | * | 4/2011 | Domenig | A47B 57/20 211/144 |
| 10,278,886 | B2 | * | 5/2019 | Fong | A61H 3/02 |

FOREIGN PATENT DOCUMENTS

JP        2011169346 A       9/2011

OTHER PUBLICATIONS

First Chinese Office Action dated Jun. 24, 2022 for corresponding Chinese Application No. 202110317605.3.

* cited by examiner

*Primary Examiner* — Robert Sandy
(74) *Attorney, Agent, or Firm* — David D. Brush; Westman, Champlin & Koehler, P.A.

(57) ABSTRACT

Provided is a fixing member which is used for fixing a component to a target member. The fixing member includes two holding portions, a joining portion, and a projecting portion. The two holding portions are configured to hold the target member from both sides. The joining portion connects two first ends of the two holding portions. The projecting portion protrudes from the joining portion toward an opening between two second ends of the two holding portions. The two second ends are opposite the two first ends of the two holding portions. The projecting portion has an end close to the opening, and the end protrudes further than at least one of the two second ends of the two holding portions in a direction where the projecting portion protrudes from the joining portion.

12 Claims, 7 Drawing Sheets

FIXING MEMBER AND JOINED COMPONENT

CROSS-REFERENCE TO RELATED APPLICATIONS

This application claims the benefit of Japanese Patent Application No. 2020-052789 filed on Mar. 24, 2020 with the Japan Patent Office, the entire disclosure of which is incorporated herein by reference.

BACKGROUND

The present disclosure relates to a fixing member and a joined component.

Fixing members are used to fix a component to a target member, such as a pipe. There has been disclosed a C-shaped fixing member assembled to a target member by gripping the target member.

Japanese Unexamined Patent Application Publication No. 2011-169346 discloses that the C-shaped fixing member includes a boss member in the C-shaped portion of the fixing member. The boss member is fitted into a hole formed on a pipe (i.e. target member) to inhibit the C-shaped fixing member from moving in a thrust direction and a rotation direction relative to the pipe.

SUMMARY

However, in the fixing member disclosed in the Japanese Unexamined Patent Application Publication No. 2011-169346, the boss member, which is used for positioning, is short. Thus, when assembling the fixing member to the target member, it may be difficult for an operator to see the boss member behind the C-shaped portion. Thus, when inserting a leading end of the boss member into a hole formed in the target member, the operator may have to change a viewing angle to see the leading end of the boss member and the hole. This may reduce workability.

In one aspect of the present disclosure, provided is a fixing member that allows an operator to easily see a positioning portion and thus easily assemble the fixing member to the target member. The present disclosure also provides a joined component in which the fixing member and the target member is connected.

In one aspect of the present disclosure, provided is a fixing member which is used for fixing a component to a target member. The fixing member includes two holding portions, a joining portion, and a projecting portion. The two holding portions are configured to hold the target member from both sides. The joining portion connects two first ends of the two holding portions. The projecting portion protrudes from the joining portion toward an opening between two second ends of the two holding portions. The two second ends are opposite the two first ends of the two holding portions. The projecting portion has an end close to the opening, and the end protrudes further than at least one of the two second ends of the two holding portions in a direction where the projecting portion protrudes from the joining portion.

With such configuration, the end of the projecting portion is not covered by the two holding portions, and an operator can easily see the end of the projecting portion. Thus, the operator can easily assemble the fixing member to the target member.

In one aspect of the present disclosure, the projecting portion may have a length to penetrate the target member. With such configuration, the fixing member can be stably assembled to the target member.

In one aspect of the present disclosure, the projecting portion may have a protrusion in a portion close to the end at a position exposed from the target member. With such configuration, the protrusion may inhibit the projecting portion from moving in a direction in which the projecting portion comes off from the target member. Thus, the projecting portion is less likely to come off from the target member.

In one aspect of the present disclosure, the projecting portion may have a first maximum diameter in a portion close to a foot of the projecting portion, and the first maximum diameter is larger than a second maximum diameter in a portion close to the end. With such configuration, the projecting portion has higher strength since the foot of the projecting portion, which is likely to receive weight of the fixing member and/or a component attached to the fixing member, is formed thicker.

In one aspect of the present disclosure, the fixing member may further include an elastic piece. The elastic piece is located close to the joining portion in a space formed by the two holding portions and the joining portion so as to extend along the joining portion. The elastic piece is elastically deformable toward the joining portion. With such configuration, in response to the elastic piece coming in contact with the target member, the elastic piece elastically deforms toward the joining portion. Thus, even if there is variation in size of the target member, the fixing member can be stably assembled to the target member.

In one aspect of the present disclosure, the two holding portions extend in the direction where the projecting portion protrudes from the joining portion. With such configuration, the two holding portions and the projecting portion each has a shape extending in the same direction. Thus, the operator can easily assemble the fixing member to the target member along the direction.

In one aspect of the present disclosure, the fixing member may be used for fixing a component to an inner panel reinforcement.

In one aspect of the present disclosure, provided is a joined component in which the fixing member and the target member are connected.

BRIEF DESCRIPTION OF THE DRAWINGS

Some example embodiments of the present disclosure will be described hereinafter by way of example with reference to the accompanying drawings, in which.

DETAILED DESCRIPTION OF EXEMPLARY EMBODIMENTS

1. Configuration

Figure 1:
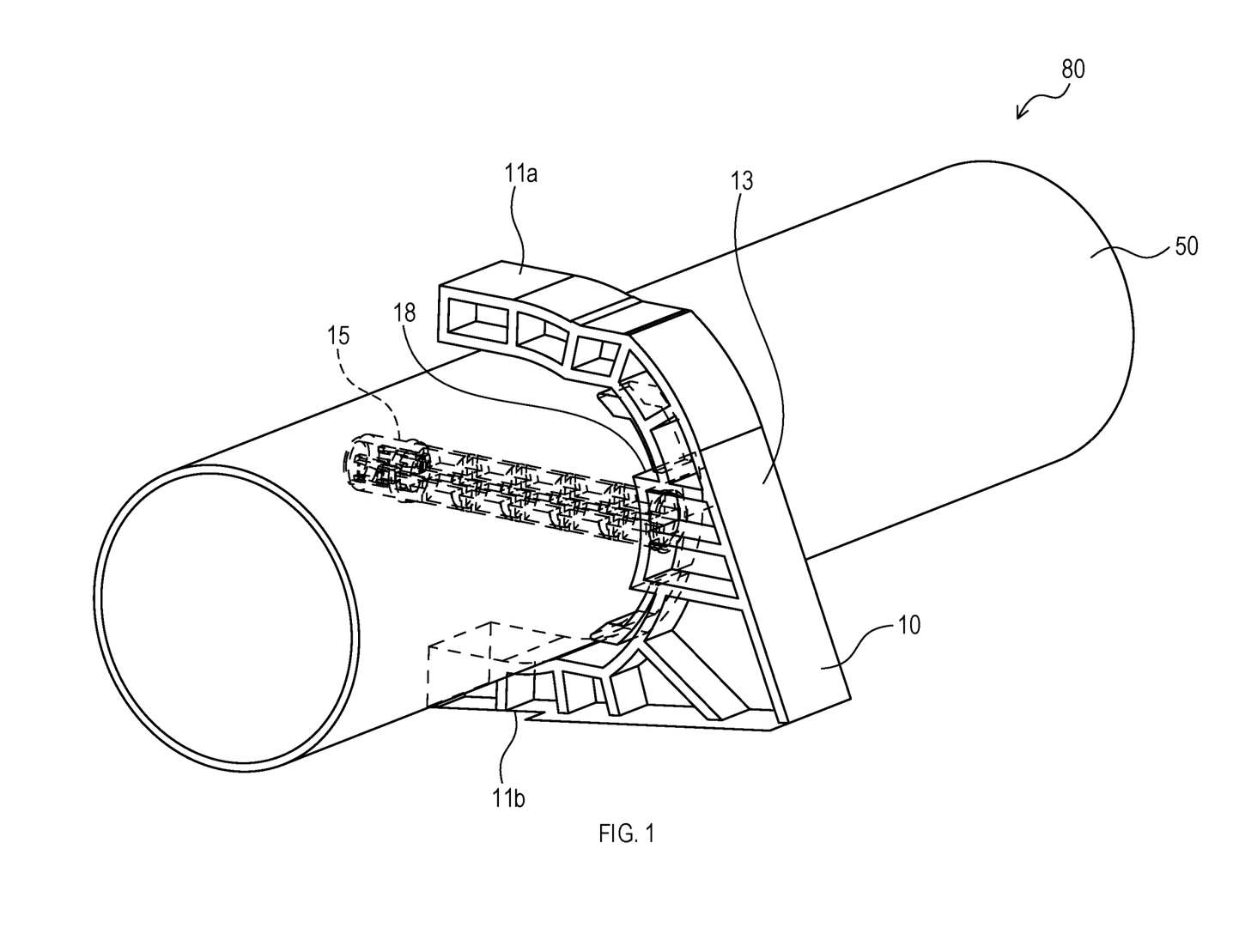
FIG. 1 is a perspective view of a joined component in which a target member and a fixing member are connected.
Figure 2:
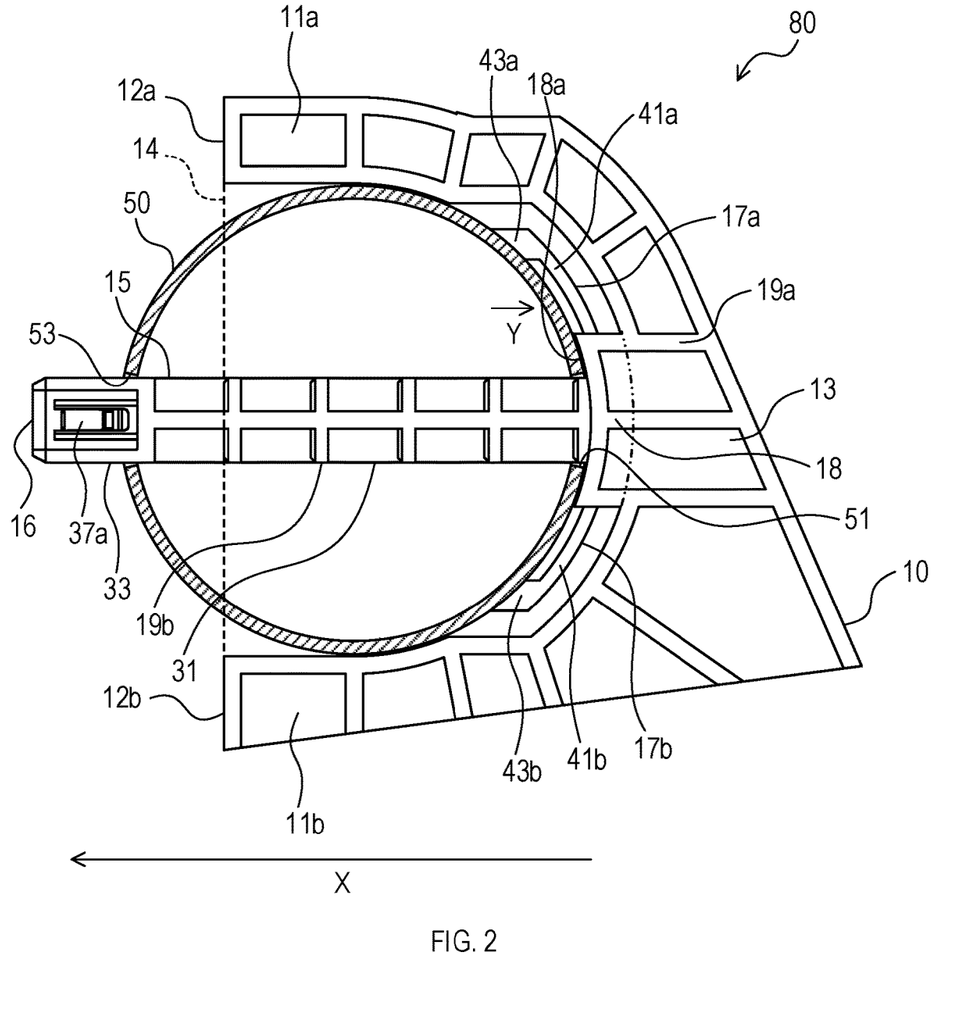
FIG. 2 is a cross-sectional view of the joined component seen from a cross-section of the target member.

As shown in FIG. 1 and FIG. 2, a fixing member 10 is a resin member to assemble a component to a target member 50. In the present embodiment, the target member 50 is a pipe portion of a metal inner panel reinforcement forming a framework of a vehicle. Examples of the component assembled to the target member 50 (i.e. the inner panel reinforcement) may include a steering wheel, an instrument panel, an audio device, and electric control unit (ECU), and they are attached to the fixing member 10. FIG. 1 and FIG. 2 show a joined component 80 in which the fixing member 10 and the target member 50 are connected.

The fixing member 10 includes two holding portions 11a, 11b, a joining portion 13, and a projecting portion 15.

The two holding portions 11a, 11b are configured to hold the target member 50 from both sides. Specifically, the two holding portions 11a, 11b face each other so that the target member 50 is held from top and bottom and the holding portion 11a is on an upper side.

The joining portion 13 connects a first end of the holding portion 11a and a first end of the holding portion 11b. That is, the two holding portions 11a, 11b and the joining portion 13 are integrally formed into a C-shape.

The projecting portion 15 is a bar member protruding from the joining portion 13. The projecting portion 15 protrudes from the joining portion 13 toward an opening 14, as shown in FIG. 2. The opening 14 is located between a second end 12a of the holding portion 11a and a second end 12b of the holding portion 11b. The second end 12a is opposite the first end of the holding portion 11a, and the second end 12b is opposite the first end of the holding portion 11b. The opening 14 is an opening of the C-shape that is integrally formed by the two holding portions 11a, 11b and the joining portion 13. The opening 14 is a portion which does not cover a periphery of the target member 50. The projecting portion 15 is positioned in the middle of a space between the two holding portions 11a, 11b.

The two holding portions 11a, 11b each have a shape extending in a direction X in which the projecting portion 15 protrudes from the joining portion 13. The Japanese Unexamined Patent Application Publication No. 2011-169346 discloses a configuration in which a C-shaped portion to grip a target member has two arms greatly curved inward so that the two ends of the two arms face very closer to each other. On the other hand, in the present disclosure, the holding portions 11a, 11b extends so that inner-circumferential surfaces close to the second ends 12a, 12b of the holding portions 11a, 11b are substantially parallel to each other in the direction X, in which the projecting portion 15 protrudes.

In the direction X, in which the projecting portion 15 protrudes from the joining portion 13, the projecting portion 15 has an end 16 close to an opening 14, and the end 16 protrudes further than the ends 12a, 12b of the two holding portions 11a, 11b. This will be described in detail below.

As shown in FIG. 1 and FIG. 2, the fixing member 10 is assembled to the target member 50 with the projecting portion 15 penetrating the target member 50. That is, the projecting portion 15, which protrudes from the joining portion 13, has a length to penetrate the target member 50. The projecting portion 15 is inserted into two through holes 51, 53 of the target member 50. Here, the through hole 51 is provided close to the joining portion 13 to pass the projecting portion 15 therethrough. The through hole 53 is provided close to the opening 14. The through holes 51, 53 have diameters almost the same as the outer circumference of the projecting portion 15 so that the projecting portion 15 fits into the through holes 51, 53.

In the direction X, the ends 12a, 12b of the two holding portions 11a, 11b are positioned closer to the joining portion 13 than a circumferential end of the target member 50 near through hole 53. However, in order to stably hold the target member 50, in a cross section shown in FIG. 2, the two holding portions 11a, 11b and the joining portion 13 are formed so as to cover at least half of the target member 50 along an outer circumferential direction of the target member 50. Specifically, the ends 12a, 12b of the two holding portions 11a, 11b are positioned close to the end 16 in the direction X compared to a central axis of the pipe-shaped target member 50.

The projecting portion 15 includes a body portion 31 and a leading end portion 33. The body portion 31 is positioned inside the target member 50 and the leading end portion 33 is exposed outside the target member 50 when the fixing member 10 is attached to the target member 50.

The body portion 31 of the projecting portion 15 is a cylindrical shape portion that has a uniform thickness and that protrudes from a base portion 18 of the joining portion 13 in the direction X. The base portion 18 of the joining portion 13 is a base for the body portion 31 of the projecting portion 15 to extend from the joining portion 13. The base portion 18 is a protruded portion sticking out in the direction X from the rest of the joining portion 13. The base portion 18 has a width that is the same as a width of the two holding portions 11a, 11b in a depth direction in FIG. 2 (hereinafter, simply referred to as "depth direction"). The depth direction in FIG. 2 means a depth relative to a top-bottom direction where the two holding portions 11a, 11b are aligned and a right-left direction along the direction X.

The base portion 18 of the joining portion 13 is larger than the through hole 51 in a cross-section orthogonal to the direction X. The base portion 18 has a surface 18a on an end 16 side of the projecting portion 15. In a state where the fixing member 10 is assembled to the target member 50, the surface 18a is engaged with an edge of the through hole 51 in an outer-circumferential surface of the target member 50. Thus, the base portion 18 inhibits the fixing member 10 from moving toward the target member 50 in the direction X.

The body portion 31 of the projecting portion 15 has a width smaller than the width of the base portion 18 in the depth direction. The body portion 31 has a height shorter than a height of the base portion 18 in the top-bottom direction.

Figure 3:
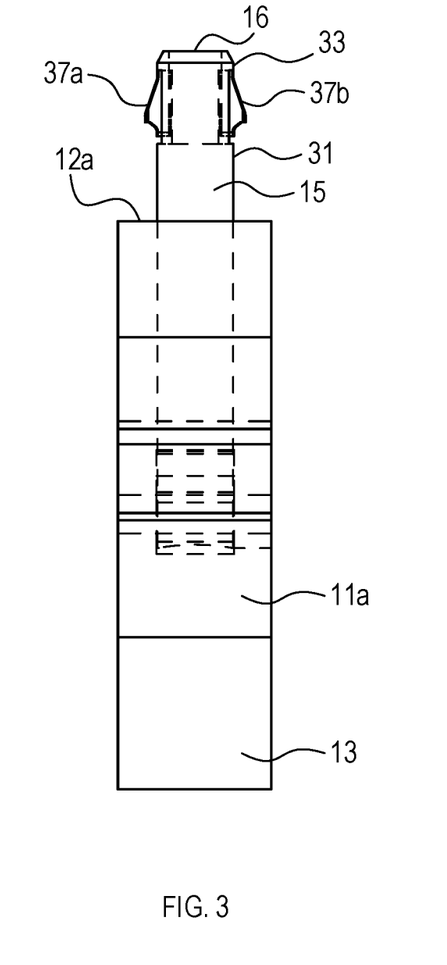
FIG. 3 is a top view of the fixing member.
Figure 4:
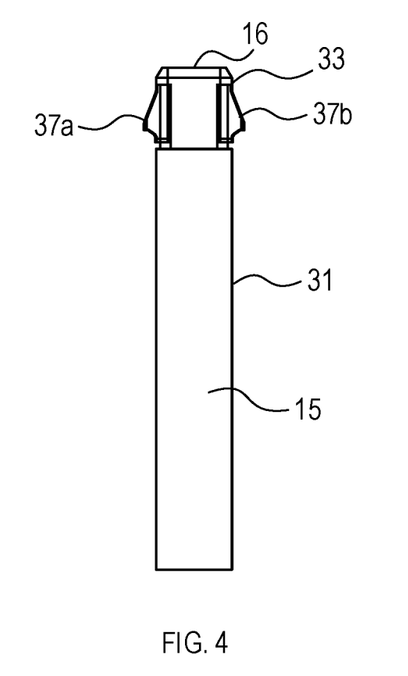
FIG. 4 is a top view of a projecting portion.

The leading end portion 33 of the projecting portion 15 has, as shown in FIG. 3 and FIG. 4, a cylindrical shape slightly thinner than the body portion 31. The leading end portion 33 is slightly tapered near the end 16. The leading end portion 33 has two engagement projections 37a, 37b near the body portion 31. The engagement projection 37a is provided on a front side in the depth direction and the engagement projection 37b is provided on a back side in the depth direction such that two engagement projections 37a, 37b are arranged symmetrically with the projecting portion 15 interposed therebetween. The two engagement projections 37a, 37b are configured to be engaged with the edge of the through hole 53 in the outer-circumferential surface of the target member 50. The engagement projections 37a, 37b may be engaged with the edge of the through hole 53 by so-called snap-fit mechanism where resins undergo elastic deformation.

As shown in FIG. 2, the base portion 18 of the joining portion 13 includes two elastic pieces 17a, 17b extending from the base portion 18. The two elastic pieces 17a, 17b are located close to the joining portion 13 in a space formed by the two holding portions 11a, 11b and the joining portion 13. The two elastic pieces 17a, 17b each have an entirely flat plate shape and each extend along the joining portion 13. The two elastic pieces 17a, 17b are arranged symmetrically with the projecting portion 15 interposed therebetween. The elastic piece 17a is positioned above the projecting portion 15, and the elastic piece 17b is positioned below the projecting portion 15. Having a thin plate shape, the two elastic pieces 17a, 17b are elastically deformable toward the joining portion 13, specifically, in a direction Y toward the joining portion 13 along an extending direction of the projecting portion 15. The direction Y is opposite the direction X.

Specifically, the elastic piece 17a includes an elastic plate portion 41a extending from the base portion 18 and an abutting portion 43a formed on a leading end of the elastic plate portion 41a. The elastic piece 17b includes an elastic plate portion 41b extending from the base portion 18 and an abutting portion 43b formed on a leading end of the elastic plate portion 41b. The elastic plate portions 41a, 41b are flat portions extending along the joining portion 13. The abutting portions 43a slightly protrudes in the direction X on the leading end of the elastic plate portions 41a. Similarly, the abutting portions 43b slightly protrudes in the direction X on the leading end of the elastic plate portions 41b. The abutting portions 43a, 43b come in contact with the outer-circumferential surface of the target member 50 when the fixing member 10 is assembled to the target member 50.

As shown in FIG. 2, the two holding portions 11a, 11b and the joining portion 13 include a rib 19a on a surface along a plane running in the top-bottom direction and the right-left direction. The rib 19a includes protrusions forming a substantially netlike pattern. Similarly, the projecting portion 15 has a rib 19b, which includes protrusions forming a substantially netlike pattern, on the outer-circumferential surface thereof. The ribs 19a, 19b are provided to reinforce the fixing member 10, and thus, improve the strength of the fixing member 10.

The rib 19a provided on the two holding portions 11a, 11b and the joining portion 13 includes protrusions radially extending toward a center of the target member 50. The rib 19b, which is provided on the outer-circumferential surface of the projecting portion 15, includes protrusions forming a grid pattern.

2. Effect

According to the aforementioned embodiment, the following effects can be obtained.

(2a) In the direction X, in which the projecting portion 15 protrudes from the joining portion 13, the end 16 of the projecting portion 15, which is located close to the opening 14, protrudes further than the ends 12a, 12b of the two holding portions 11a, 11b. With such configuration, the end 16 of the projecting portion 15 is not covered by the two holding portions 11a, 11b. This allows an operator to easily see the end 16. Therefore, the operator can easily assemble the fixing member 10 to the target member 50.

In the case where, for example, an operator stands facing the through hole 51 of the target member 50 and inserts the projecting portion 15 of the fixing member 10 into the through hole 51 of the target member 50 while seeing the target member 50 from above, the operator can see the end 16 of the projecting portion 15 as shown in FIG. 3, since the end 16 protrudes further than the end 12a of the holding portion 11a even if the projecting portion 15 is partially overlapped with the holding portion 11a. Therefore, in comparison with the case where the end 16 of the projecting portion 15 does not protrude further than the end 12a of the holding portion 11a and thus the end 16 of the projecting portion 15 is unseen from an operator, workability improves in assembling the fixing member 10 to the target member 50 since the operator can insert the projecting portion 15 into the through hole 51 while seeing the end 16 of the projecting portion 15.

(2b) The projecting portion 15 has a length to penetrate the target member 50. With such configuration, the fixing member 10 is fixed to the target member 50 with the projecting portion 15 penetrating the target member 50. Thus, the fixing member 10 can be stably assembled to the target member 50.

(2c) The projecting portion 15 includes the engagement projections 37a, 37b in a portion close to the end 16 of the projecting portion 15 at a position exposed from the target member 50. The engagement projections 37a, 37b are configured to be engaged with the through hole 53 located close to the opening 14 between the ends 12a, 12b of the two holding portions 11a, 11b. With such configuration, the engagement projections 37a, 37b inhibit the projecting portion 15 from moving in a direction in which the projecting portion 15 comes off from the through holes 51, 53 of the target member 50. Thus, the projecting portion 15 is unlikely to come off from the target member 50.

(2d) The fixing member 10 includes the elastic pieces 17a, 17b. The elastic pieces 17a, 17b are located close to the joining portion 13 in a space formed by the two holding portions 11a, 11b and the joining portion 13. The elastic pieces 17a, 17b are formed along the joining portion 13. The elastic pieces 17a, 17b are elastically deformable toward the joining portion 13. With such configuration, the elastic pieces 17a, 17b come into contact with the target member 50 and elastically deform in the direction Y toward the joining portion 13 along the extending direction of the projecting portion 15. Thus, even if there is variation in size of the target member 50, the fixing member 10 can be stably assembled to the target member 50.

(2e) The two holding portions 11a, 11b each have a shape extending in the direction X in which the projecting portion 15 protrudes from the joining portion 13. With such configuration, the two holding portions 11a, 11b and the projecting portion 15 each have a shape extending along the same direction. Thus, the fixing member 10 can be easily fitted into the target member 50 along the direction.

The C-shaped fixing member disclosed in the Japanese Unexamined Patent Application Publication No. 2011-169346 has two arms greatly curved inward to grip a target member so that the two end portions of the two arms face very closer to each other. The C-shaped portion is greatly and elastically deformable to hold the target member between the two arms of the C-shaped portion of the fixing member. On the contrary, the two holding portions 11a, 11b of the fixing member 10 of the embodiment have relatively high stiffness. This is because the fixing member 10 is required to have high strength to attach a relatively heavy component, such as a steering wheel as aforementioned, to the target member 50. In order to hold the target member 50 between the holding portions 11a, 11b that have relatively high stiffness and that are unlikely to greatly deform, the two holding portions 11a, 11b and the projecting portion 15 each have a shape extending along the same direction.

3. Other Embodiment

The embodiment of the present disclosure have been described. However, it is understood that the present disclosure is not necessarily limited to the above embodiment, and can be variously modified within the technical scope of the present disclosure.

Figure 5:
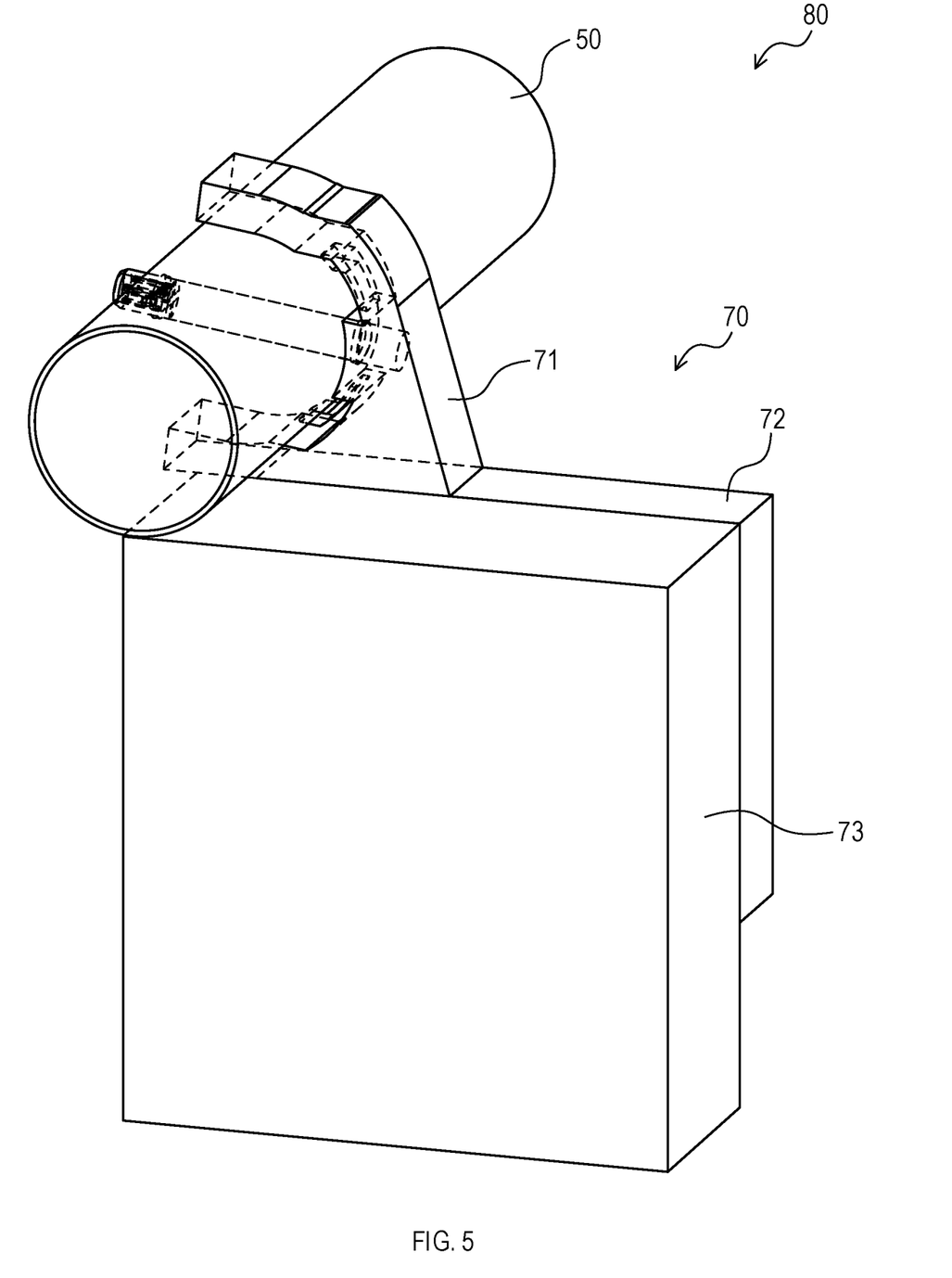
FIG. 5 shows an exemplary variation of the fixing member.

(3a) In the aforementioned embodiment, a component that is different from the fixing member 10 and that is assembled to the target member 50 is separately attached to the fixing member 10. However, the fixing member 10 shown in the aforementioned embodiment may be integrally formed with the component. For example, a fixing member 70 shown in FIG. 5 includes a fixing portion 71 having a shape similar to the fixing member 10 of the aforementioned embodiment, an extending portion 72 extending from the fixing portion 71, and a case 73 that is connected to the extending portion 72 and that stores an ECU assembled to the target member 50. The fixing portion 71, the extending portion 72 and the case 73 are integrally formed. In FIG. 5, the ribs 19a, 19b are not shown for simplification.

(3b) In the aforementioned embodiment, the end 16 of the projecting portion 15 protrudes further than ends 12a, 12b of the two holding portions 11a, 11b in the direction X. However, the end 16 of the projecting portion 15 may protrude further than either one of the ends 12a, 12b of the two holding portions 11a, 11b.

(3c) In the aforementioned embodiment, as shown in FIG. 2, the end 16 of the projecting portion 15 protrudes from the cylindrical outer-circumferential surface of the pipe-shaped target member 50. However, the end 16 of the projecting portion 15 does not necessarily protrude from the outer-circumferential surface of the pipe, and the end 16 of the projecting portion 15 may be positioned inside the target member 50. For example, the through hole 53 of the target member 50 may include a flange that is formed by burring and that extends inside the target member 50, and the flange may be engaged with the leading end portion 33 of the projecting portion 15. As is in the case of the aforementioned embodiment where the fixing member 10 is assembled to the target member 50 with the projecting portion 15 passing through the target member 50, the above configuration also allows the projecting portion 15 to be supported on the target member 50 at two positions near the foot of the projecting portion 15 (i.e. near the through hole 51) and near the end 16 (i.e. near the through hole 53) in a state of the projecting portion 15 inserted into the target member 50. Therefore, the fixing member 10 can be stably assembled to the target member 50.

Figure 6:
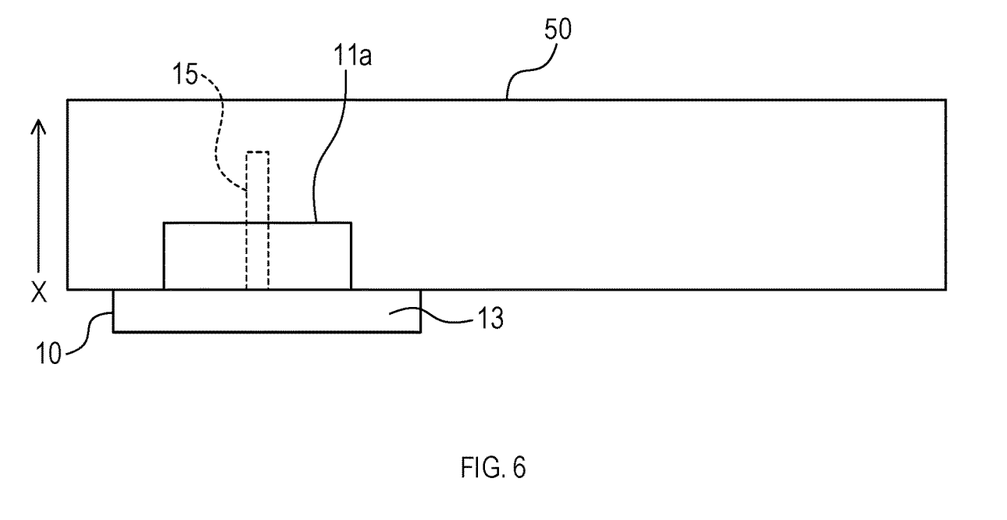
FIG. 6 is a schematic top view of a joined component showing an exemplary variation of the fixing member having distinct lengths of a projecting portion and a holding portion.

(3d) The length of the projecting portion 15 is not necessarily limited to the length shown in the aforementioned embodiment. For example, as shown in FIG. 6, the projecting portion 15 does not necessarily penetrate the target member 50.

In the aforementioned embodiment, the projecting portion 15 is positioned within a space between the two holding portions 11a, 11b. However, the projecting portion 15 may be positioned outside the space between the two holding portions 11a, 11b.

(3e) In the aforementioned embodiment, the target member 50 is a pipe. However, the shape of the target member 50 is not necessarily limited to the pipe shape. For example, the target member 50 is not necessarily a member having a hollow structure like a pipe, but the target member 50 may be a member having a solid structure. Furthermore, for example, the outer shape of the target member 50 does not necessarily have a cylindrical shape, but may have an elliptic cylindrical shape or a rectangular columnar shape.

(3f) The shape of the projecting portion 15 is not necessarily limited to the shape shown in the aforementioned embodiment.

For example, in the aforementioned embodiment, the projecting portion 15 has a cylindrical shape. However, the projecting portion 15 may have a cornered polygonal columnar shape. Furthermore, for example, in the aforementioned embodiment, the projecting portion 15 has a shape that becomes thinner stepwise from near the joining portion 13 toward the end 16; however, the projecting portion 15 may have a shape that becomes thinner smoothly.

Figure 7:
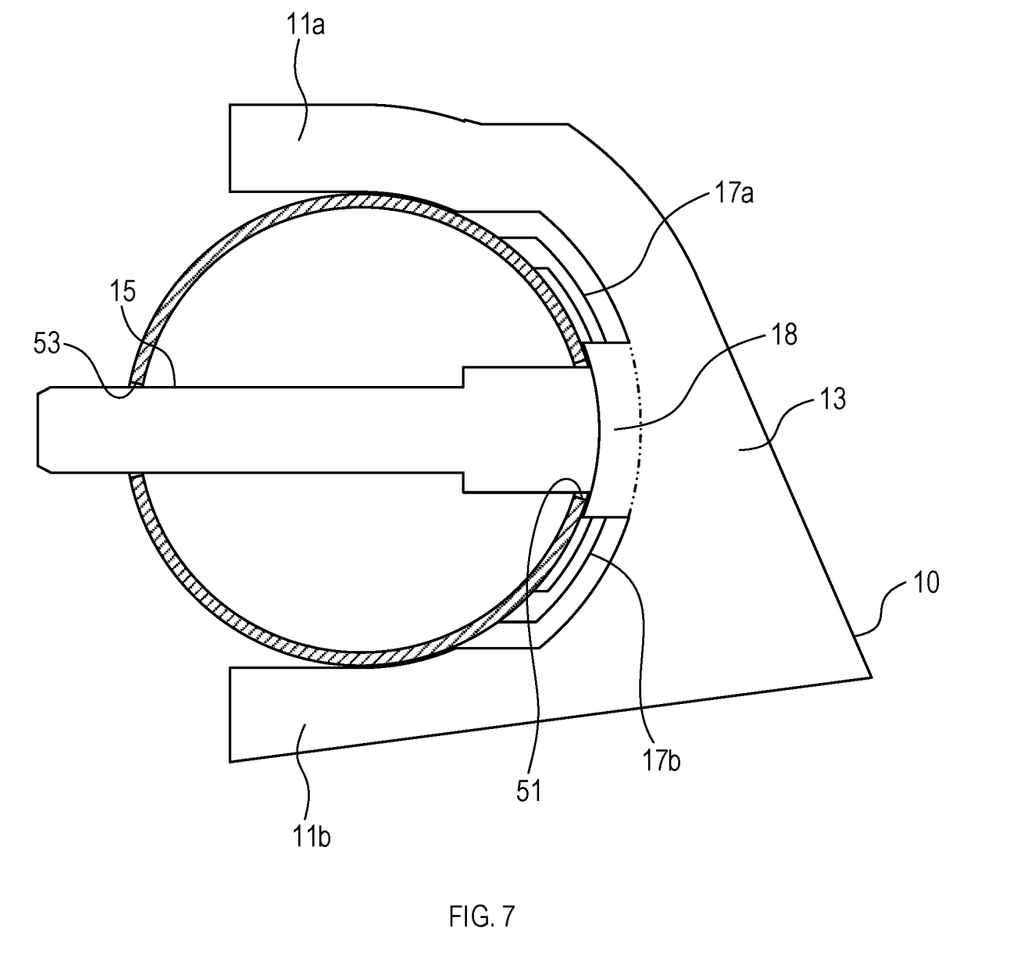
FIG. 7 is a cross-sectional view of a joining portion showing an exemplary variation of the fixing member having a projecting portion in a distinct shape.

For example, as shown in FIG. 7, the projecting portion 15 has a first maximum diameter in a portion close to the foot of the projecting portion 15, and the first maximum diameter is larger than a second maximum diameter in a portion close to the end 16. Specifically, the projecting portion 15 has the first maximum diameter corresponding to a first opening close to the joining portion 13 (i.e. the through hole 51), and the first opening is formed in the target member 50 to pass the projecting portion 15 therethrough. This first maximum diameter is larger than the second maximum diameter corresponding to a second opening close to the opening 14 (i.e. the through hole 53) between the ends 12a, 12b of the two holding portions 11a, 11b. Here, the term of "maximum diameter" means a maximum width of the projecting portion 15 in any direction in a cross-section of the projecting portion 15 (In other words, "maximum diameter" means a diameter of a smallest circle enclosing the cross-section of the projecting portion 15). The cross-section of the projecting portion 15 is orthogonal to the direction X. For example, in the case where the projecting portion 15 has a cylindrical shape as aforementioned, the "maximum diameter" is a diameter. In the case where the projecting portion 15 has a rectangular columnar shape, the "maximum diameter" is a length of a maximum diagonal line of the quadrangle in the cross-section. In FIG. 7, the two engagement projections 37a, 37b and the ribs 19a, 19b are omitted for simplification.

With such configuration, the projecting portion 15 has higher strength since the portion close to the foot, which is likely to receive weight of the fixing member 10 and/or a component attached to the fixing member 10, is formed thicker.

In addition, with such configuration, the through hole 51 (the first opening close to the joining portion 13) is bigger than the through hole 53 (the second opening close to the opening 14). The second maximum diameter of the projecting portion 15 is almost the same as the diameter of the through hole 53. Thus, when the portion close to the end 16 of the projecting portion 15 is inserted into the through hole 51 (the first opening close to the joining portion 13), there is a space between the projecting portion 15 and the through hole 51. Thus, the projecting portion 15 can be easily inserted into the through holes 51, 53 compared with the case where, for example, the projecting portion 15 has a uniform diameter and the two the through holes 51, 53 have the same size.

In the case where the target member 50 has the solid structure, "the first opening close to the joining portion 13" means a opening of a through hole penetrating the solid target member 50. The first opening is provided in the outer circumference of the target member 50 and located close to the joining portion 13. Similarly, "the second opening close to the opening 14 between the ends 12a, 12b of the two holding portions 11a, 11b", means, in this case, a opening of the through hole penetrating the solid target member 50. The second opening is provided in the outer circumference of the target member 50 and located close to the end 16 of the projecting portion 15.

(3g) The shape of the two holding portions 11a, 11b is not necessarily limited to the shape shown in the aforementioned embodiment.

In the aforementioned embodiment, the inner-circumferential surfaces close to the ends 12a, 12b of the two holding portions 11a, 11b extend substantially parallel to the direction X in which the projecting portion 15 extends; however, portions close to the ends 12a, 12b of the two holding portions 11a, 11b may be greatly curved inward, for example.

In addition, for example, the two holding portions 11a, 11b may be divided into two or more portions in the depth direction in FIG. 2.

(3h) In the aforementioned embodiment, the target member 50 includes the through holes penetrating in the right-left direction and the two holding portions 11a, 11b gripping the target member 50 from the top-bottom direction. However, the fixing member 10 may be assembled to the target member 50 from other direction. For example, the target member 50 may have through holes penetrating in the top-bottom direction and the two holding portions 11a, 11b gripping the target member 50 from the right-left direction.

(3i) The thickness of the two holding portions 11a, 11b in the top-bottom direction may be suitably designed in accordance with conditions including a weight of a component assembled to the target member 50, a position of the component attached to the fixing member 10, and a position of the fixing member 10 assembled to the target member 50. Similarly, the width of the two holding portions 11a, 11b in the depth direction in FIG. 2 may be suitably designed in accordance with conditions, such as the weight of the component assembled to the target member 50.

(3j) In the aforementioned embodiment, the two holding portions 11a, 11b are formed to have relatively high stiffness and the two holding portions 11a, 11b are less deformable. However, the two holding portions 11a, 11b may be elastically deformable. With such configuration, even if there is variation in size of the target member 50, the fixing member 10 can be stably assembled to the target member 50.

(3k) The structure of the ribs 19a, 19b are not necessarily limited to the structure shown in the aforementioned embodiment. For example, the ribs 19a, 19b may have a honeycomb structure. Also, the ribs 19a, 19b may include protrusions forming a seamless X pattern.

(3l) In the aforementioned embodiment, the fixing member 10 is made of resin; however, the material of the fixing member 10 is not necessarily limited to resin. For example, the fixing member 10 may be formed by die-cast including metals such as aluminum and iron.

(3m) In the aforementioned embodiment, the target member 50 is an inner panel reinforcement and the fixing member 10 is used for fixing a component to the inner panel reinforcement; however, the target member 50 is not necessarily limited to the inner panel reinforcement and the fixing member 10 may be used for fixing a component other than the inner panel reinforcement.

(3n) In the aforementioned embodiment, a method of assembling the fixing member 10 to the target member 50 has been described assuming that an operator stands facing the through hole 51 of the target member 50 and the operator inserts the projecting portion 15 of the fixing member 10 into the through hole 51 of the target member 50 while seeing the target member 50 from above. However, the position where the operator stands and the method of assembling the fixing member 10 to the target member 50 is not necessarily limited to the aforementioned embodiment.

(3o) The function(s) performed by a single element in the above embodiments may be performed by two or more elements. The function(s) performed by two or more elements may be integrated into a single element. A part of the configuration of the above embodiments may be omitted. At least a part of the configuration of the above embodiments may be added to or replaced in the configuration of the above-described other embodiments.

What is claimed is:

1. A fixing member which is used for fixing a component to a target member, the fixing member comprising:
    two holding portions configured to hold the target member from both sides;
    a joining portion connecting two first ends of the two holding portions;
    a projecting portion protruding from the joining portion toward an opening between two second ends of the two holding portions, the two second ends being opposite the two first ends of the two holding portions, the projecting portion having an end close to the opening, the end of the projecting portion protruding further than at least one of the two second ends of the two holding portions in a direction where the projecting portion protrudes from the joining portion; and
    an elastic piece, wherein the elastic piece is located close to the joining portion in a space formed by the two holding portions and the joining portion so as to extend along the joining portion, and wherein the elastic piece is elastically deformable toward the joining portion.

2. The fixing member according to claim 1, wherein the projecting portion has a length to penetrate the target member.

3. The fixing member according to claim 2, wherein the projecting portion has a protrusion in a portion close to the end at a position exposed from the target member.

4. The fixing member according to claim 1, wherein the projecting portion has a first maximum diameter in a portion close to a foot of the projecting portion, and the first maximum diameter is larger than a second maximum diameter in a portion close to the end.

5. The fixing member according to claim 1, wherein the two holding portions extend in the direction where the projecting portion protrudes from the joining portion.

6. The fixing member according to claim 1, wherein the fixing member fixes the component to an inner panel reinforcement.

7. A joined component in which a target member and a fixing member which is used for fixing a component to the target member are connected,
    the fixing member including:
    two holding portions configured to hold the target member from both sides;
    a joining portion connecting two first ends of the two holding portions;
    a projecting portion protruding from the joining portion toward an opening between two second ends of the two holding portions, the two second ends being opposite the two first ends of the two holding portions, the projecting portion having an end close to the opening, the end of the projecting portion protruding further than at least one of the two second ends of the two holding portions in a direction where the projecting portion protrudes from the joining portion; and an elastic piece, wherein the elastic piece is located close to the joining portion in a space formed by the two holding portions and the joining portion so as to extend along the joining portion, and wherein the elastic piece is elastically deformable toward the joining portion.

8. The joined component according to claim 7, wherein the projecting portion has a length to penetrate the target member.

9. The joined component according to claim 8, wherein the projecting portion has a protrusion in a portion close to the end at a position exposed from the target member.

10. The joined component according to claim 7, wherein the projecting portion has a first maximum diameter in a portion close to a foot of the projecting portion, and the first maximum diameter is larger than a second maximum diameter in a portion close to the end.

11. The joined component according to claim 7,
wherein the two holding portions extend in the direction where the projecting portion protrudes from the joining portion.

12. A joined component in which a target member and a fixing member which is used for fixing a component to the target member are connected,
the fixing member including:
two holding portions configured to hold the target member from both sides;
a joining portion connecting two first ends of the two holding portions; and
a projecting portion protruding from the joining portion toward an opening between two second ends of the two holding portions, the two second ends being opposite the two first ends of the two holding portions, the projecting portion having an end close to the opening, the end of the projecting portion protruding further than at least one of the two second ends of the two holding portions in a direction where the projecting portion protrudes from the joining portion,
wherein the target member is an inner panel reinforcement.

* * * * *